(12) United States Patent
Lee et al.

(10) Patent No.: US 6,956,468 B2
(45) Date of Patent: Oct. 18, 2005

(54) SENSING MECHANISM FOR HITCH ARTICULATION ANGLE

(75) Inventors: Yong H. Lee, Troy, MI (US); Weiwen Deng, Rochester Hills, MI (US); Willard A. Hall, Dryden, MI (US); Thomas R. Brown, Shelby Township, MI (US); Joseph J. Gies, III, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 121 days.

(21) Appl. No.: 10/434,839

(22) Filed: May 9, 2003

(65) Prior Publication Data
US 2004/0222880 A1 Nov. 11, 2004

(51) Int. Cl.⁷ .............................................. G08B 21/00
(52) U.S. Cl. ........................ 340/431; 280/504; 280/511
(58) Field of Search .............................. 340/431, 686.1, 340/687, 686.2, 686.3; 307/10.8; 280/477, 493, 511, 507, 504, 400, 478.1; D12/161, 162

(56) References Cited

U.S. PATENT DOCUMENTS

| | | | | |
|---|---|---|---|---|
| 3,479,057 A | * | 11/1969 | Miller | 280/511 |
| 3,794,356 A | * | 2/1974 | Hollis, Jr. | 280/513 |
| 4,122,390 A | * | 10/1978 | Kollitz et al. | 340/870.38 |
| 5,097,250 A | | 3/1992 | Hernandez | |
| 5,152,544 A | | 10/1992 | Dierker, Jr. et al. | |
| 5,247,442 A | | 9/1993 | Kendall | |
| 5,407,219 A | * | 4/1995 | Chiu | 280/422 |
| 5,579,228 A | * | 11/1996 | Kimbrough et al. | 701/41 |
| 5,860,669 A | * | 1/1999 | Wass et al. | 280/416.1 |
| 5,912,616 A | | 6/1999 | Valentino | |
| 6,042,196 A | * | 3/2000 | Nakamura et al. | 303/7 |
| 6,268,800 B1 | | 7/2001 | Howard | |
| 6,655,710 B2 | | 12/2003 | Lindell et al. | 280/419 |
| 6,783,144 B2 | * | 8/2004 | McCoy et al. | 280/511 |

* cited by examiner

Primary Examiner—Jeffery Hofsass
Assistant Examiner—Eric Blount
(74) Attorney, Agent, or Firm—Kathryn A. Marra

(57) ABSTRACT

The invention describes a sensor mechanism for measuring hitch articulation angle. A configuration of the contact face between hitch ball and receiver eliminates the effect of the unwanted trailer motions, such as roll and pitch while accurately registering trailer yaw motion. Also, there is no yaw slippage at the contact that was a major problem during the successive acceleration and brake maneuvers. With the freely rotating ball and shaft, the angle is measured using an angle sensor, such as an optical encoder, potentiometer, or other means. For the case of a relative angle sensor, automatic zero angle calibration can be used to allow an absolute angle measurement.

20 Claims, 3 Drawing Sheets

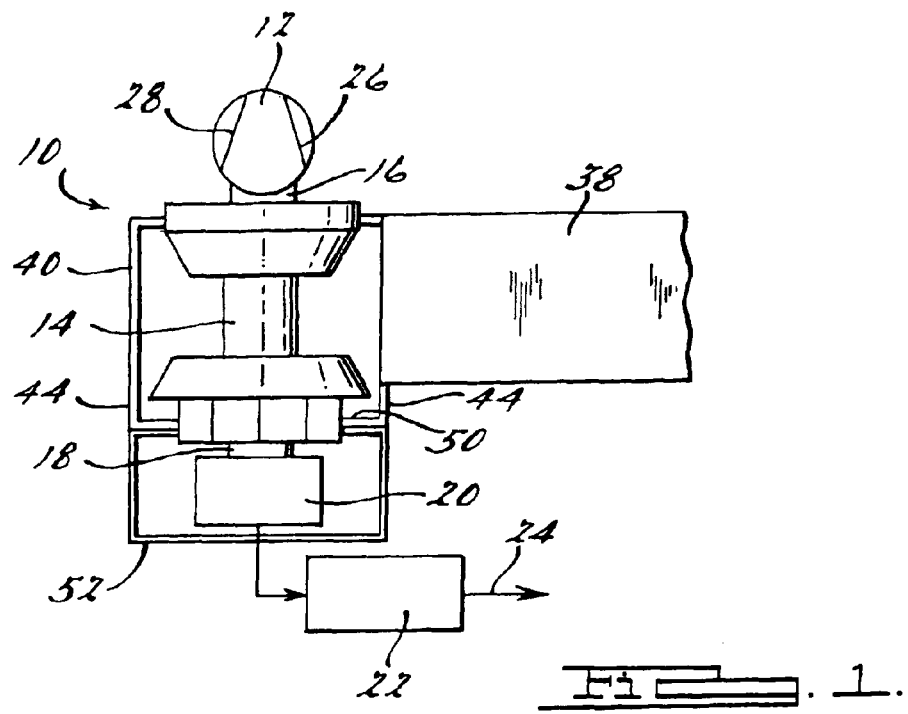
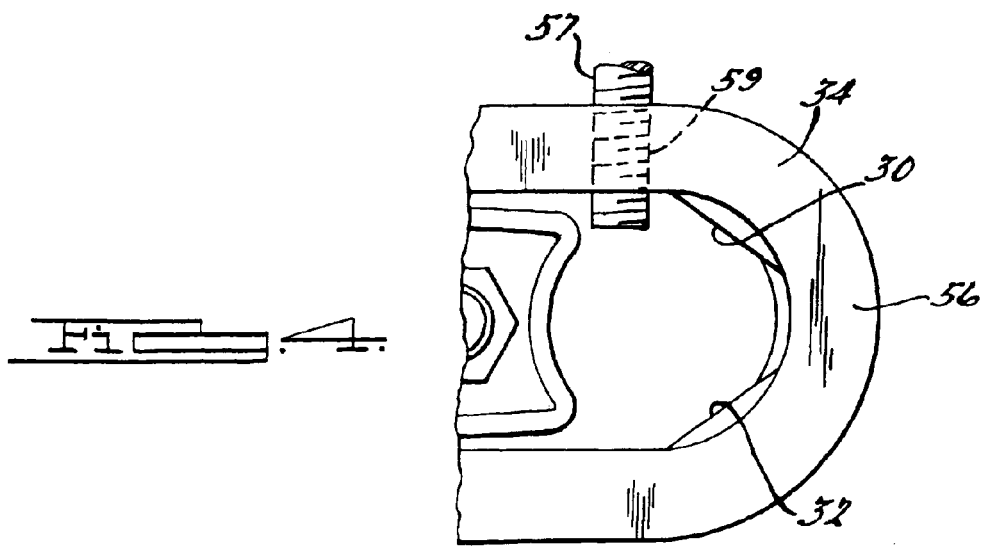

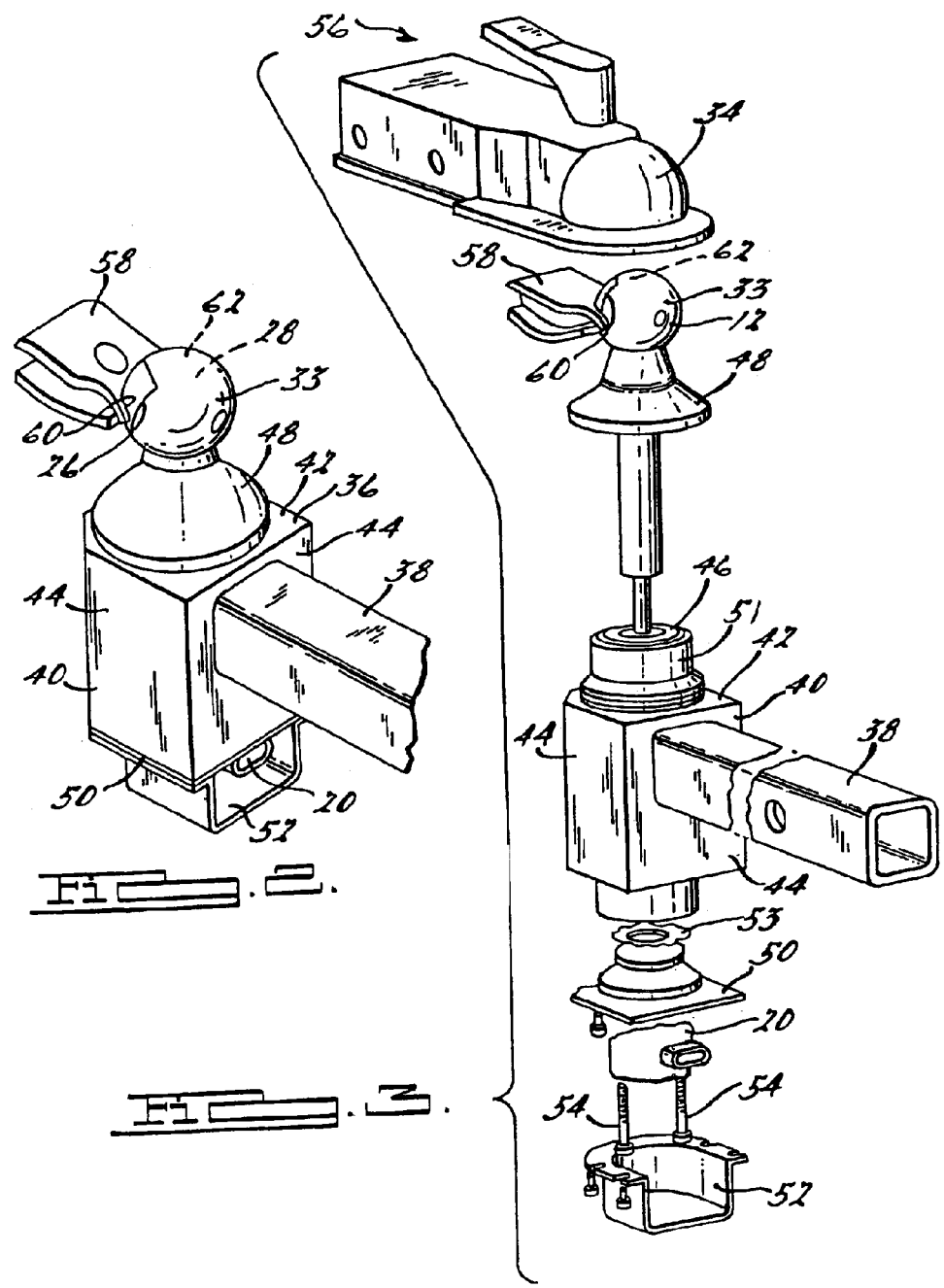

SENSING MECHANISM FOR HITCH ARTICULATION ANGLE

FIELD OF THE INVENTION

The present invention relates to a hitch mechanism and, more particularly, to an articulating hitch mechanism having an angle sensor configured to measure the hitch's articulation angle.

BACKGROUND OF THE INVENTION

The knowledge on hitch articulation angle is very critical for controlling towing stability of a vehicle-trailer, as well as backing up. There have been many attempts in monitoring the angle using a non-contact means such as camera, ultra sound device, radar, and/or laser. Because hitch mechanisms are exposed to the harsh environments, the devices described above are not robust enough. Also, the aforementioned systems are either too expensive or technically cumbersome. For many contact type sensors, the major drawbacks are the effects of the unwanted trailer motions, such as roll and pitch. Furthermore, during acceleration and deceleration, a ball may slip in the hitch socket causing errors in the angle measurement.

The prior art systems which measure hitch angles often utilize the dynamic hitch angle values to regulate vehicle dynamics. All of these systems proposed some methods of sensing hitch angle as a part of trailer motion control algorithms, such as jackknifing sensing, vehicle-trailer stability control, backing-up process control. The devices disclosed, however, have either some limits or deficiencies, which cause them to be neither accurate nor robust enough in the harsh environments.

SUMMARY OF THE INVENTION

In one embodiment of the present invention, a ball hitch assembly is disclosed having a hitch ball with a spherical exterior interface surface and at least one generally flat interface surface. The hitch ball further has a coupling post structure. A support structure is configured to rotatably support the hitch ball post. An angle sensor which is configured to measure rotations of the head is provided.

In another embodiment of the invention, a hitch assembly for a vehicle-trailer combination comprises a hitch ball rotatably coupled to the vehicle. The hitch ball defines at least one generally flat coupling surface. An angle sensor is configured to measure rotation of the hitch ball. A coupler housing is coupled to the trailer. The coupler housing defines a cavity configured to receive the hitch ball. The coupler housing further defines a bearing surface configured to interface with the coupling surface.

In another embodiment of the invention, a hitch assembly for a vehicle-trailer combination having a support structure coupled to the vehicle is disclosed. A hitch ball is rotatably coupled to the support structure. The hitch ball has a pair of generally flat coupling surfaces. An angle sensor is configured to measure rotation of the hitch ball. A coupler housing is coupled to the trailer. The coupler housing defines a cavity configured to receive the hitch ball. The coupler housing defines a pair of bearing surfaces configured to interface with the coupling surface and prevent the rotation of the hitch ball with respect to the coupler housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 represents the hitch assembly according to the teachings of the present invention;

FIG. 2 represents a perspective view of the hitch assembly shown on FIG. 1;

FIG. 3 represents and exploded view of the hitch assembly shown in FIG. 2;

FIG. 4 represents a bottom view of a ball clamp trailer coupler;

DETAILED DESCRIPTION OF THE PREFERRED EMBODIMENTS

Figure 5:
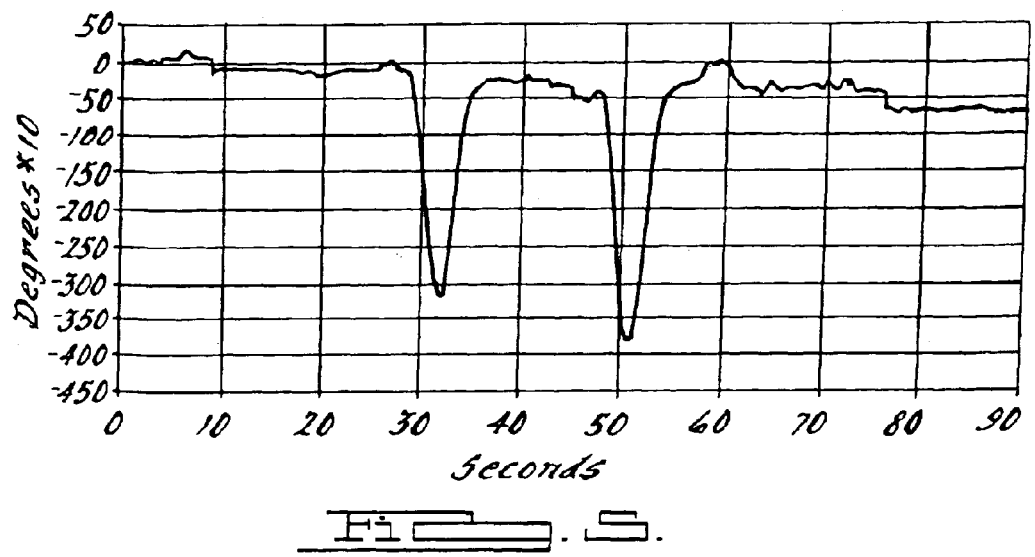
FIG. 5 represents angle measurement using a round hitch ball.

The following description of the preferred embodiment(s) is merely exemplary in nature and is in no way intended to limit the invention, its application, or uses.

The hitch assembly 10 according to the teachings of the present invention is configured to provide either an absolute angle measurement which does not require calibration after the hitch is connected or a hitch connection, which provides auto calibration to determine an absolute zero position. FIG. 1 depicts the hitch assembly 10 having a modified hitch ball 12 coupled to a post 14 at a post proximal end 16. Disposed at a distal end 18 of the post 14 is an angle sensor 20 configured to measure the articulation of the hitch ball 12 by measuring rotation of the post 14 and associated hitch ball 12. The hitch mechanism 10 further comprises a signal conditioner 22 which is configured to convert signals provided from the angle sensor 20 into a signal 24 indicative of a hitch articulation angle.

The hitch ball 12 shown in FIGS. 1–3 define a pair of generally planar exterior surfaces 26 and 28 which are configured to interface with a pair of corresponding surfaces 30 and 32 within the ball clamp trailer coupler 34 (as described below). The interface between the surfaces 26 and 28 and 30 and 32 function to prevent slippage between the ball clamp trailer coupler 34 and the hitch ball 12. While the hitch ball 12 is shown having a pair of surfaces 26 and 28 disposed on the exterior surface 33 of the hitch ball 12, it is envisioned that the hitch ball 12 could equally function with a pair of surfaces defined in the form of a slot within the hitch ball 12.

The hitch assembly 10 is formed of a first portion 36 which is coupled to a vehicle hitch receiver (not shown). As seen in FIGS. 2 and 3, the hitch assembly 10 is formed of a coupling bar 38 which is welded to a support box section 40. The support box section 40 is defined by an upper support surface 42 and depending sides 44. The upper support surface 42 defines an aperture 46 which is configured to annularly support the hitch ball 12 and post 14 subassembly. As shown in FIGS. 2 and 3, the hitch ball 12 is supported by a conical support member 48 which is configured to sealably enclose a bearing/bushing assembly 51 which is disposed on the upper support surface 42 and within the aperture 46. The bushing assembly 51 functions to seal the assembly against the intrusion of water and dirt.

As seen in FIG. 1, the box section 40 is closed by an intermediate support plate 50. The intermediate support plate 50 functions to axially couple the post 14 to the box section 40. Alternatively, the intermediate support plate 50 functions to support the angle sensor 20 and allow the rotation of the post 14 within the angle sensor 20. The angle sensor 20 is protected from debris and water by a cover member 52 as well as a rubber seal 53. The cover member 52 is coupled to the intermediate support plate 50 by four fasteners. Fastener 54 functions to hold the angle sensor 20 onto the support plate 50.

FIG. 4 represents a bottom view of a ball clamp trailer coupler 56. Disposed within the ball clamp trailer coupler 56 is the pair of corresponding surfaces 30 and 32 which mate with the generally planar surfaces 26 and 28. Optionally, the ball clamp trailer coupler 56 can define a threaded bore 59 configured to accept a set screw 57. The set screw 57 is configured to bear against the generally planar surfaces 26 and 28. As seen in FIGS. 2 and 3, optionally, the ball clamp 58 can have a pair of surfaces 60 and 62 which are configured to mate with the corresponding surfaces 26 and 28 of the hitch ball 12.

FIG. 5 represents a graph showing angle measurements using a regular round hitched ball. As can be seen, the graph begins showing that the hitch angle is zero degrees. As the vehicle and trailer assembly goes through a number of turns and braking operations, slippage occurs between the ball joint and an angle sensor. As can be seen after time 60 second, even though the vehicle and trailer have returned to a zero degree orientation, the resultant value sensed by the sensor no longer corresponds to a zero degree configuration. This is caused by slippage and rotation of the ball within the hitch assembly.

Figure 6:
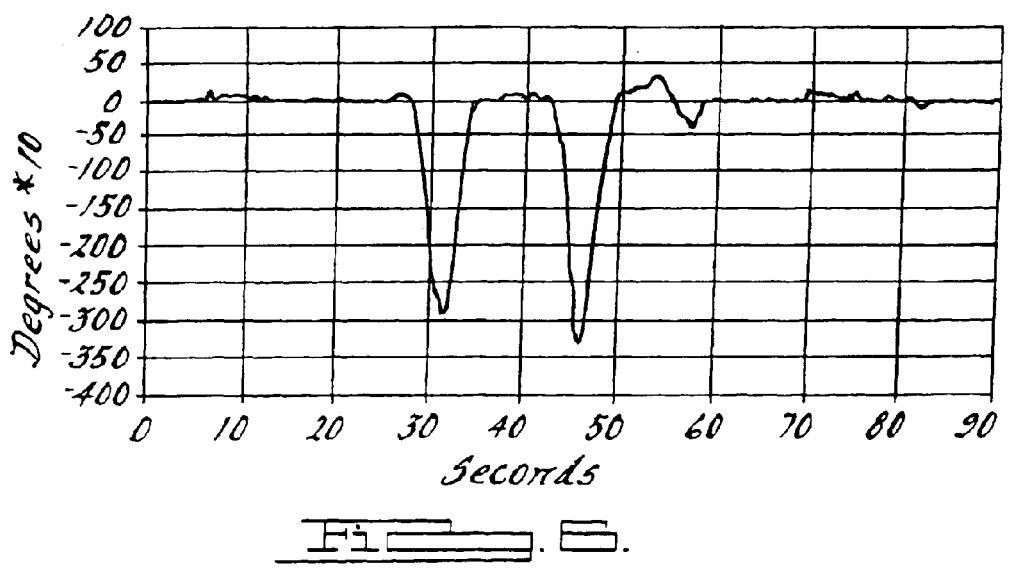
FIG. 6 represents angle measurements using a keyed hitch ball.

FIG. 6 represents and angle measurement using a keyed hitch ball. As can be seen, after making several braking and turning operations, the keyed ball returns the sensor to an absolute zero value when the vehicle-trailer combination is traveling in a forward direction.

The angle sensor 20, according to the teachings of the present invention, has a resolution of 0.176 Degree/Count. It is envisioned that the angular sensor 20 can utilize optical methods, a potentiometer, or other means to measure changes in the hitch angle. It also is envisioned that auto calibration can be used in the system by monitoring the hand wheel angle and vehicle speed. For example, if the vehicle is traveling at a constant speed for a set amount of time, and the vehicle direction has not changed, the system can automatically calibrate this as a zero degree condition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A ball hitch assembly for sensing an articulation angle between a vehicle and a trailer, the ball hitch assembly comprising:
   a hitch ball having a spherical exterior interface surface and at least one generally flat interface surface;
   a post coupled to the hitch ball;
   an angle sensor configured to measure rotations of the post; and
   a support structure configured to rotatably support the hitch ball,
   wherein the generally flat interface surface is configured to mate with a corresponding bearing surface such that the hitch ball cannot rotate with respect to the bearing surface.

2. The hitch ball assembly according to claim 1 further comprising a coupler housing, said coupler housing defining an interior cavity configured to receive the hitch ball, said coupler housing further defining a bearing surface configured to interface with the generally flat interface surface of the hitch ball.

3. The hitch ball assembly according to claim 2 wherein the interior cavity defines a bearing surface.

4. The hitch ball assembly according to claim 2 wherein the coupler housing comprises a ball clamp.

5. The hitch ball assembly according to claim 4 wherein the ball clamp defines the bearing surface.

6. The hitch ball assembly according to claim 1 wherein the support structure comprises a support surface defining an aperture, the aperture configured to rotatably accept the poet.

7. The hitch ball assembly according to claim 6 further comprising a bushing/bearing assembly disposed about said post.

8. The hitch ball assembly according to claim 1 wherein the angle sensor is configured to provide an absolute hitch angle.

9. The hitch ball assembly according to claim 1 wherein the angle sensor is configured to provide an auto calibration as a function of vehicle speed and wheel angle.

10. A hitch assembly for a vehicle-trailer combination comprising:
    a hitch ball rotatably coupled to the vehicle, said hitch ball defining at least one generally flat coupling surface;
    an angle sensor configured to measure rotation of the hitch ball;
    a coupler housing, coupled to the trailer, said coupler housing defining a cavity configured to receive the hitch ball, said coupler housing further defining a bearing surface configured to interface with the coupling surfaces,
    wherein the interface of the bearing surface with the coupling surface prevents rotation of the hitch ball with respect to the coupler housing.

11. The hitch assembly according to claim 10 wherein the coupler housing cavity defines a bearing surface.

12. The hitch assembly according to claim 10 wherein the coupler housing comprises a ball clamp.

13. The hitch assembly according to claim 12 wherein the ball clamp defines a bearing surface.

14. The hitch assembly according to claim 10 wherein the hitch ball defines a pair of flat coupling surfaces defined on an exterior surface of the ball.

15. The hitch assembly according to claim 10 wherein the angle sensor is configured to provide an absolute hitch angle.

16. The hitch assembly according to claim 10 further comprising a support structure configured to couple the hitch ball to the vehicle.

17. The hitch assembly according to claim 10 wherein the coupler housing defines a pair of bearing surfaces configured to interface with the hitch ball coupling surface and prevent the hitch ball from rotating relative to the coupler housing.

18. A hitch assembly for a vehicle-trailer combination comprising:
    a support structure coupled to the vehicle;
    a hitch ball rotatably coupled to the support structure, said hitch ball having a pair of generally flat coupling surfaces forming one of a slot or a keyed surface; an angle sensor configured to measure rotation of the hitch ball;

a coupler housing coupled to the trailer, the coupler housing defining an interior cavity configured to receive the hitch ball, the coupler housing defining a pair of bearing surfaces configured to interface with the coupling surface and prevent the rotation of the hitch ball with respect to the coupler housing.

19. The hitch assembly according to claim 18 wherein the interior cavity defines the pair of bearing surfaces.

20. The hitch assembly according to claim 19 wherein the coupler housing comprises a clamp defining the bearing surfaces.

* * * * *